US012649130B2

(12) United States Patent
Lundkvist

(10) Patent No.: US 12,649,130 B2
(45) Date of Patent: Jun. 9, 2026

(54) MIXING DEVICE

(71) Applicant: Cytiva Sweden AB, Uppsala (SE)

(72) Inventor: Mats Lundkvist, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 1350 days.

(21) Appl. No.: 17/286,834

(22) PCT Filed: Oct. 29, 2019

(86) PCT No.: PCT/EP2019/079567

§ 371 (c)(1),
(2) Date: Apr. 20, 2021

(87) PCT Pub. No.: WO2020/089250

PCT Pub. Date: May 7, 2020

(65) Prior Publication Data

US 2021/0339209 A1 Nov. 4, 2021

(30) Foreign Application Priority Data

Oct. 30, 2018 (GB) ..................................... 1817692

(51) Int. Cl.
*B01F 25/452* (2022.01)
*B01F 23/45* (2022.01)

(52) U.S. Cl.
CPC .......... *B01F 25/4521* (2022.01); *B01F 23/45* (2022.01)

(58) Field of Classification Search
CPC .. B01F 25/4521; B01F 23/45; B01F 25/4233; B01F 25/422; B01F 25/40
See application file for complete search history.

(56) References Cited

U.S. PATENT DOCUMENTS 1,737,336 A 11/1929 Sager
2,132,854 A 10/1938 Knott
(Continued)

FOREIGN PATENT DOCUMENTS

CN 101087643 A 12/2007
CN 101909730 A 12/2010
(Continued)

OTHER PUBLICATIONS

English translation of CN-205216619-U, Zhong, obtained on Jan. 12, 2024 from <https://worldwide.espacenet.com > (Year: 2024).*
(Continued)

*Primary Examiner* — Claire X Wang
*Assistant Examiner* — Patrick M McCarty
(74) *Attorney, Agent, or Firm* — Eversheds-Sutherland (US) LLP

(57) ABSTRACT

The present disclosure relates to a mixing device (9) comprising an inlet channel (25), an outlet channel (27), a mixing cavity (29) and a laminar mixing element (31) arranged within the mixing cavity. The inlet channel extends along an axis (21) of the mixing device from a first end (23) of the mixing device to the mixing cavity. The outlet channel extends along the axis from the mixing cavity to a second end (24) of the mixing device arranged opposite to the first end. The mixing cavity is arranged between the inlet channel and the outlet channel and extends in an axial direction (A) along the axis and in a radial direction (R) outwardly from the axis to an outer wall (30) of the mixing cavity. The laminar mixing element extends radially across the mixing cavity, subdividing the mixing cavity into an inlet portion (26) and an outlet portion (28). The mixing element comprises a plurality of holes (41) extending through the mixing element. The said holes are distributed over the mixing element.

21 Claims, 5 Drawing Sheets

(56) References Cited

U.S. PATENT DOCUMENTS

| | | | | | |
|---|---|---|---|---|---|
| 4,068,830 | A * | 1/1978 | Gray | B01F 25/4521 366/175.2 |
| 4,786,185 | A | 11/1988 | Knief | |
| 5,137,369 | A * | 8/1992 | Hodan | B01J 19/0093 366/337 |
| 5,356,565 | A | 10/1994 | Southwell | |
| 5,460,449 | A | 10/1995 | Kent et al. | |
| 5,547,281 | A * | 8/1996 | Brooks | B01F 25/45 366/176.1 |
| 6,447,158 | B1 * | 9/2002 | Farkas | B01F 27/092 366/172.1 |
| 2006/0087917 | A1 * | 4/2006 | Ehrfeld | B01F 25/422 366/DIG. 3 |
| 2011/0003370 | A1 | 1/2011 | Gordon et al. | |
| 2013/0337081 | A1 * | 12/2013 | Matsumoto | A61P 11/00 119/72 |
| 2018/0056252 | A1 * | 3/2018 | Steele | B01F 25/4338 |

FOREIGN PATENT DOCUMENTS

| | | | |
|---|---|---|---|
| CN | 204275831 | U | 4/2015 |
| CN | 204973634 | U | 1/2016 |
| CN | 205216619 | U | 5/2016 |
| CN | 106902662 | A | 6/2017 |
| DE | 202004019745 | U1 | 2/2005 |
| EP | 2189212 | A1 | 5/2010 |
| EP | 2653214 | A1 | 10/2013 |
| GB | 19096012 | | 3/1909 |
| GB | 19139911 | | 11/1913 |
| GB | 1205210 | | 9/1970 |
| JP | 53-062972 | U | 5/1978 |
| JP | S51-146405 | A | 6/1978 |
| JP | S577237 | A | 1/1982 |
| JP | S59-146989 | A | 9/1985 |
| JP | 60-176237 | U | 11/1985 |
| JP | S63107736 | A | 5/1988 |
| JP | H04-272210 | A | 9/1992 |
| JP | H0671150 | A | 3/1994 |
| JP | 2009-241001 | A | 10/2009 |
| JP | 2010-247348 | A | 4/2010 |
| JP | 2012-000581 | A | 1/2012 |
| JP | 2015-83282 | A | 4/2015 |
| JP | 2017-24002 | A | 2/2017 |
| JP | 2020-37104 | A | 3/2020 |
| SU | 1260014 | A1 | 9/1986 |
| WO | 2005/028093 | A1 | 3/2005 |
| WO | 2011/003412 | A2 | 1/2011 |
| WO | 2012/81682 | A1 | 6/2012 |
| WO | 2014185500 | A1 | 11/2014 |

OTHER PUBLICATIONS

English translation of JP2009241001A, Seno et al., obtained Jan. 16, 2024 from <https://worldwide.espacenet.com/ > (Year: 2024).*

English translation of JP2012000581A, Eguchi et al., obtained Jan. 16, 2024 from < https://worldwide.espacenet.com/> (Year: 2024).*

English translation of WO-2011003412-A2, Grohrock et al., Jan. 13, 2011, obtained from <https://worldwide.espacenet.com/> on Jun. 20, 2024 (Year: 2024).*

Office Action Issued in Chinese Patent Application No. 201980072009.4, dated Nov. 3, 2022 with English Translation (9 Pages).

Search Report Issued in Chinese Patent Application No. 201980072009.4, dated Oct. 26, 2022 with English Translation (6 Pages).

Office Action Issued in corresponding JP Application No. 2021-523411 with English Translation, dated Oct. 16, 2023 (29 Pages).

PCT International Search Report and Written Opinion for PCT/EP2019/079567 mailed Mar. 31, 2020 (15 pages).

Great Britain Search Report for GB Application No. 1817692.5 mailed Apr. 30, 2019 (4 pages).

Office Action Issued in corresponding EP Application No. 19797245, dated Apr. 18, 2023 with Search Report (32 Pages).

Office Action Issued in corresponding JP Application No. 2021-523411 with English Translation, dated May 5, 2023 (29 Pages).

* cited by examiner

MIXING DEVICE

CROSS REFERENCE TO RELATED APPLICATIONS

This application claims the priority benefit of PCT/EP2019/079567, filed on Oct. 29, 2019, which claims the benefit of Great Britain Application No. 1817692.5, filed on Oct. 30, 2018, the entire contents of which are incorporated by reference herein.

TECHNICAL FIELD

The present invention relates to a mixing device for laboratory systems.

BACKGROUND ART

In laboratory systems for the synthesis and/or purification of molecules or biomolecules it is often necessary to mix buffers or solvents to a desired ratio. This may be achieved by using a switch valve alternating between a first liquid flow and a second liquid flow, wherein the desired ratio is achieved by controlling the duration of first liquid flow relative to the duration of the second liquid flow. This allows the desired ratio to be varied as required over time, thus for example permitting gradient elution from chromatography columns. However, the switching between two different liquids causes a certain periodic fluctuation in the obtained ratio between the first liquid and second liquid due to less than perfect diffusive mixing between the two liquids. In order to diminish or remove this fluctuation it is often necessary to pass the liquid through a mixer subsequent to the switching valve.

Magnetic mixers are commonly used in the art in order to obtain sufficient mixing and diminish undesired fluctuation in liquid composition. A magnetic mixer commonly comprises a magnetic stir bar arranged in the liquid flow path and a rotating magnetic field to induce the stir bar to spin, thus mixing the liquid in proximity to the stir bar.

There remains a need for improved means for mixing liquids for laboratory systems.

SUMMARY OF THE INVENTION

The inventor of the present invention has identified a number of shortcomings in the prior art. Magnetic mixers require moving parts and electric circuitry, which results in increased complexity and cost of the mixing device. Moreover, the magnetic mixer must be arranged within the laboratory system at a point where a supply of electricity is readily available, thus placing constraints on the location of the mixing device and the design of the laboratory system.

It is an object of the present invention to remedy or at least ameliorate at least some of the identified shortcomings. In particular, it is an object of the present invention to provide a mixing device that provides sufficient mixing of a liquid without requiring an electricity supply or moving parts.

These objects are achieved by a mixing device according to the appended independent claims.

The mixing device comprises an inlet channel, an outlet channel, a mixing cavity and a laminar mixing element arranged within the mixing cavity.

The inlet channel extends along an axis of the mixing device from a first end of the mixing device to the mixing cavity.

The outlet channel extends along the axis from the mixing cavity to a second end of the mixing device arranged opposite to the first end.

The mixing cavity is arranged between the inlet channel and the outlet channel. The mixing cavity extends in an axial direction along the axis and in a radial direction outwardly from the axis to an outer wall of the mixing cavity.

The laminar mixing element extends radially across the mixing cavity, subdividing the mixing cavity into an inlet portion and an outlet portion. The mixing element comprises a plurality of holes extending through the mixing element. The said holes are distributed over the mixing element.

Such a mixing device provides adequate mixing of a liquid passing through the device. Due to the distribution of holes over the mixing element, the length of the flow path through the device varies depending on which hole the liquid passes through. The resulting sub-division of the liquid into a multitude of individual flows following flow paths of varying length, followed by re-integration of the multitude of flows into a single integrated flow, leads to good mixing of the liquid without resort to moving parts. Due to the lack of moving parts, the mixing device does not require an electricity supply.

The mixing device may further comprise a plurality of outlet pillars distributed in the outlet portion of the mixing cavity and extending axially across the outlet portion, such that each outlet pillar supports an outlet side of the mixing element. The provision of outlet pillars supports the mixing element against the flow of liquid, thus assisting in preventing buckling or deformation of the mixing element under the hydrodynamic conditions prevailing during use of the mixing device.

The mixing device may further comprise a plurality of inlet pillars distributed in the inlet portion of the mixing cavity and extending axially across the inlet portion, such that each inlet pillar supports an inlet side of the mixing element. The provision of inlet pillars supports the mixing device in a counter-flow direction, thus assisting in preventing damage to the mixing element in the event of excessive pressure build-up in the outlet portion of the mixing cavity.

Moreover, having both inlet and outlet pillars ensures that the mixing element is adequately supported regardless of flow direction through the mixing device, thus assisting in providing a mixing device that may be utilized regardless of flow direction through the mixing device. Each inlet pillar may be arranged collinearly with a corresponding outlet pillar, such that each respective pair of inlet/outlet pillars supports the mixing element at the same region from both sides. This again assists in ensuring adequate support for the mixing element regardless of flow direction, as well as helping provide a uniform mixing performance regardless of flow direction.

The mixing device may comprise at least 10 outlet pillars, such as from 10 to 20 outlet pillars. Alternatively, or in addition, the mixing device may comprise at least 10 inlet pillars, such as from 10 to 20 inlet pillars. Such a number of supporting pillars helps ensure adequate support for the mixing element. The inlet and/or outlet pillars may be distributed both in a radial direction and in a circumferential direction over the mixing element. This assists in ensuring that the mixing element is adequately supported over its entire span.

The said plurality of holes may be distributed both in a radial direction and in a circumferential direction over the mixing element. This helps ensure good mixing of liquid passing through the mixing device.

An innermost row of the plurality of holes may be distributed at a first radial distance from the axis. An outermost row of the plurality of holes may be distributed at a second radial distance from the axis, wherein the second radial distance is greater than the first radial distance. This ensures that a variety of flow path lengths are encountered by liquid passing through the mixer and thus assists in providing good mixing. The outermost row may comprise at least twice the number of holes as compared to the innermost row, such as from three to 10 times the number of holes, preferably four times the number of holes. This assists in providing a good spatial distribution of the holes, and thus improved mixing.

The plurality of holes may consist of at least four rows, such as from five to 10 rows, preferably six rows, wherein each row is distributed at a radial distance from the axis differing from the other rows. Having a multitude of rows having different radial distances from the axis ensures that a large variety of flow path lengths are encountered by liquid passing through the mixer and thus assists in providing good mixing.

The plurality of holes may comprise at least 50 holes, such as from 100 to 300 holes, preferably about 170 holes. This ensures adequate sub-division of a liquid flowing through the mixing device into a number of sub-flows following flow paths of different lengths, and thus assists in ensuring adequate mixing.

An inner portion of the mixing element arranged concentrically with the axis, such as an inner circular portion of the mixing element, may be free from holes. This ensures that liquid may not pass directly through the mixer without following a circuitous path and thus assists in ensuring good mixing.

Each individual hole may have a diameter of from about 0.1 mm to about 1 mm, such as about 0.12 mm. All holes in the plurality of holes may have the same diameter. Correct dimensioning of the holes ensures a relatively equal flow through each hole and thus assists in providing good mixing.

The inlet channel may have a diameter of from two to 10 times the diameter of each hole, preferably about twice the diameter of each hole. The outlet channel may have a diameter of from two to 10 times the diameter of each hole, preferably about twice the diameter of each hole. This assists in providing an adequate liquid supply to the mixing element while ensuring adequate flow properties such as pressure drop over the mixing device.

The mixing cavity may have a radial diameter of from 100 to 500 times the diameter of each hole, such as about 200 times the diameter of each hole. This assists in ensuring that a substantial variation in the length of liquid flow paths may be obtained in the mixing device. This is especially advantageous in situations where the liquid composition fluctuates periodically and in order to obtain sufficient mixing the residence time in the mixing device must vary for different liquid sub-flows.

The axis may be a central axis of the mixing device. This results in the inlet channel being centrally placed in the mixing element and assists in ensuring a relatively even distribution of fluid to all holes in the mixing element.

The outer wall may be arranged concentrically with the axis, i.e. the mixing cavity and mixing element are circular. This assists in ensuring a relatively even distribution of fluid over the entire inlet surface of the mixing element.

The mixing element may be arranged in a mirror symmetry plane. The inlet channel, outlet channel and mixing cavity may exhibit mirror symmetry about the mirror symmetry plane. Since all surfaces in contact with the liquid flow exhibit mirror symmetry, the mixing device provides the same mixing result regardless of its orientation in the liquid flow path. That is to say that although the terms inlet/outlet channel are used, there may be to all extents and purposes no need to distinguish these channels from each other, i.e. the outlet channel may function as the liquid inlet and vice-versa, the inlet channel may function as the liquid outlet. Such a construction provides ease of use, since the mixing device is thus unable to be coupled in the wrong direction.

The mixing device may comprise at least three components: an inlet component, an outlet component and a laminar component. The inlet component constitutes the inlet channel, inlet portion and optionally the inlet pillars of the mixing device. The outlet component constitutes the outlet channel, outlet portion and optionally the outlet pillars of the mixing device. The laminar component constitutes the laminar mixing element.

It is important to note that the term "constitutes" is used herein as an open formulation, i.e. the relevant component forms at least the recited features, but may also make up further features. For example, the inlet and outlet components may constitute a fastening in order to assemble the mixing device.

By assembling the mixing device from multiple components, this potentially enables the mixing device to be disassembled for, for example, cleaning, sterilization, and quality control purposes. This provides a significant advantage over mixing devices that cannot be disassembled to a significant extent.

The laminar component may be manufactured by laser cutting. This provides a simple, low-cost and accurate means of machining the laminar component. The laser-cut laminar component may be manufactured from any one of a variety of materials suitable for laser cutting, including but not limited to titanium and PEEK (Polyether ether ketone). Such materials have good compatibility with a wide variety of liquids and substances that may be mixed using the mixing device.

The mixing device may further comprise a fastening component arranged to reversibly fasten the inlet component, the outlet component and the laminar component in relation to each other. In such a case, an outer surface of the inlet component and/or outlet component may comprise fastening elements such as a screw thread that may be arranged in threaded contact with the fastening component. This provides a simple means of ensuring that the various mixing device components are arranged in appropriate spatial relation to each other.

The mixing device may further comprise an inlet sealing ring arranged to provide a seal between the inlet component and the laminar component. The mixing device may further comprise an outlet sealing ring arranged to provide a seal between the outlet component and the laminar component. The use of sealing rings, also known as O-rings, is a cheap, robust means of achieving a liquid-tight seal in the mixing cavity.

Alternatively, the mixing device according may be additively manufactured as a single component. This ensures a liquid-tight mixing cavity (barring the inlet and outlet channels), and minimizes material usage. A number of materials are suitable for additive manufacturing techniques, including but not limited to titanium and PEEK, and the mixing device may suitably be manufactured from any such material.

The mixing device may be manufactured in titanium, PAEK (Polyaryletherketone), stainless or combinations thereof, preferably titanium, PEEK or combinations thereof. Such materials have excellent mechanical properties, are well suited to any manufacturing techniques that may be used to manufacture the mixing device, and have good compatibility with a wide variety of liquids and substances that may be mixed using the mixing device.

The mixing element may be manufactured in titanium PAEK, stainless or combinations thereof, preferably titanium or PEEK. Such materials have excellent mechanical properties, are well suited to any manufacturing techniques, such as laser-cutting, that may be used to manufacture the mixing element, and have good compatibility with a wide variety of liquids and substances that may be in prolonged contact with the mixing element.

Further objects, advantages and novel features of the present invention will become apparent to one skilled in the art from the following detailed description.

BRIEF DESCRIPTION OF THE DRAWINGS

For a fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
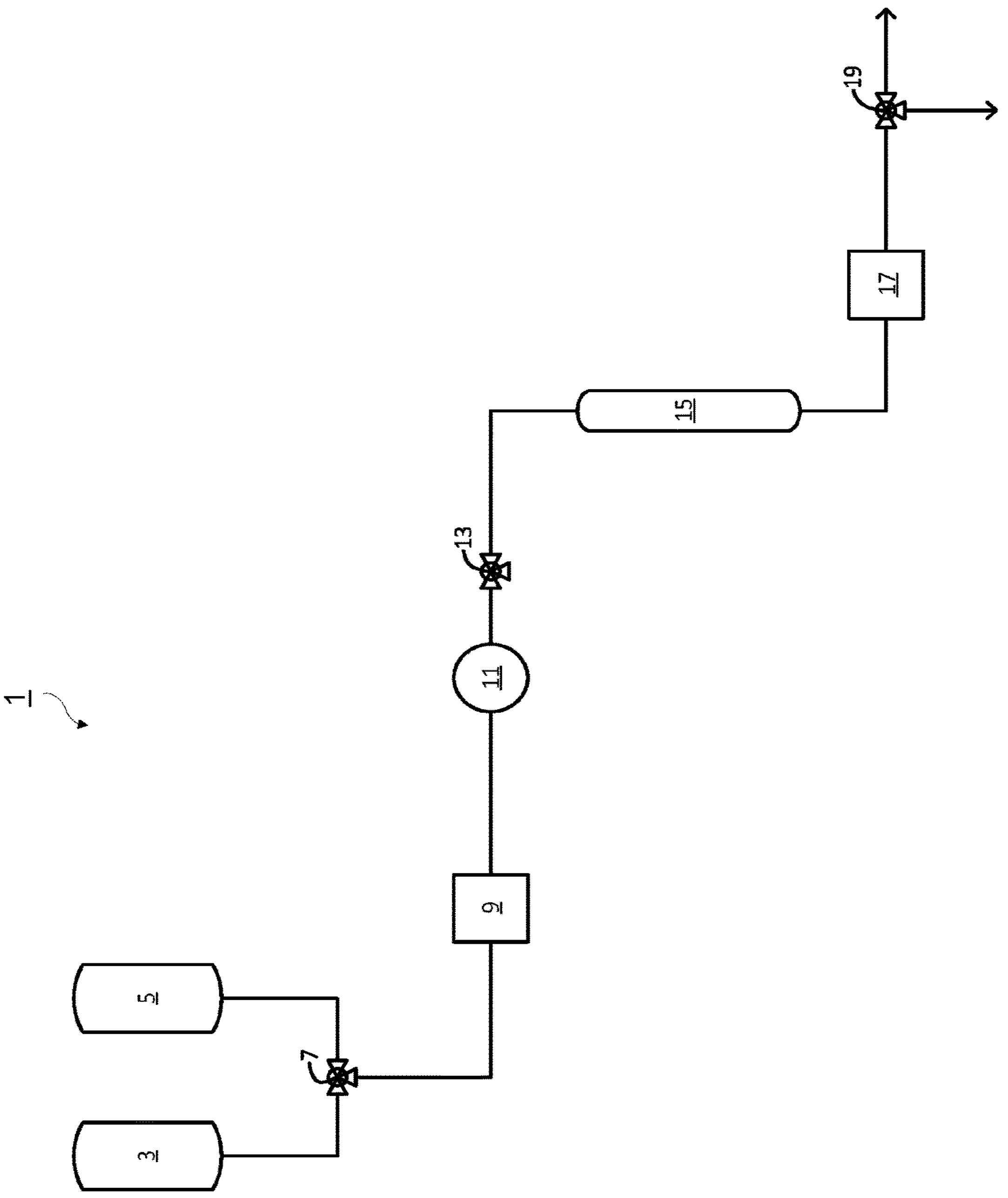
FIG. 1 schematically illustrates a laboratory system comprising a mixing device.

The mixing device according to the invention is a static mixer, i.e. a mixer that has no moving parts. The device comprises an inlet channel, an outlet channel, a mixing cavity and a laminar mixing element arranged within the mixing cavity.

The device geometry is defined in relation to an axis running through the device. The axis is preferably a central axis, such that it forms a central longitudinal axis of the inlet and outlet channels and passes through the centre of the mixing chamber.

The inlet channel extends along the axis of the mixing device from a first (proximal) end of the mixing device to the mixing cavity. The inlet channel is preferably circular in cross section (perpendicular to the axis), but other channel cross-sectional shapes such as square, hexagonal or octagonal are also feasible. The channel may be of a constant diameter, or may vary along its length. For example, the channel may narrow from the first (proximal) end towards the mixing cavity. The narrowing may be progressive (tapering), stepwise, or a combination of both. The first (proximal) end of the inlet channel may be formed or machined to facilitate attachment of tubing or tubing connectors to the first end. For example, the first end may be provided with internal or external threading, or may be provided with a Luer taper as defined in ISO 594-1:1986. The inlet channel may be of any suitable length, and may for example have a length that is less than the diameter of the mixing cavity.

The outlet channel extends along the axis from the mixing cavity to a second (distal) end of the mixing device arranged opposite to the first end. The outlet channel extends along the axis of the mixing device from a first (distal) end of the mixing device to the mixing cavity. The outlet channel is preferably circular in cross section (perpendicular to the axis), but other channel cross-sectional shapes such as square, hexagonal or octagonal are also feasible. The channel may be of a constant diameter, or may vary along its length. For example, the channel may narrow from the second (distal) end towards the mixing cavity. The narrowing may be progressive (tapering), stepwise, or a combination of both. The second (distal) end of the outlet channel may be formed or machined to facilitate attachment of tubing or tubing connectors to the first end. For example, the second end may be provided with internal or external threading, or may be provided with a Luer taper as defined in ISO 594-1:1986. The outlet channel may be of any suitable length, and may for example have a length that is less than the diameter of the mixing cavity.

The inlet and outlet channels both converge upon a mixing cavity arranged between the inlet channel and the outlet channel. The mixing cavity extends in an axial direction along the axis, providing the cavity with a certain height. The mixing cavity also extends in a radial direction perpendicularly outwards from the axis to an outer wall of the mixing cavity, thus providing the cavity with a certain diameter, wherein diameter is defined as the greatest extension in a straight line perpendicularly outwards from the axis to the outer walls of the mixing chamber. The mixing chamber is preferably essentially circular, although other shapes such as hexagonal or octagonal are also feasible.

A laminar mixing element extends radially across the mixing cavity, subdividing the mixing cavity into an inlet portion and an outlet portion. The mixing element preferably extends such that it is in contact with the entire outer circumference of the outer wall of the mixing cavity, and therefore may preferably have the same form as the mixing cavity, e.g. circular, hexagonal or octagonal. The mixing element is preferably arranged centrally in the axial direction of the mixing cavity and preferably has a thickness significantly less than the height of the mixing cavity, such that the inlet portion and outlet position of the mixing cavity both have a height approximately half that of the total height of the mixing cavity. The mixing element may be held in place by its edges interacting with the outer wall of the mixing chamber, for example being clamped between an inlet wall portion and an outlet wall portion. The mixing element may also/alternatively be held in place by the use of pillars extending across the height of the inlet and/or outlet portion in order to support the mixing element.

A plurality of holes extends through the mixing element, i.e. in a substantially axial direction, thus allowing passage of liquid from the inlet portion of the mixing cavity to the outlet portion of the mixing cavity. The plurality of holes may for example comprise at least 50 holes, such as from 100 to 300 holes, preferably about 170 holes. The holes are distributed over the mixing element, thus ensuring that at least a portion of any liquid flowing through the mixing device must take a circuitous route in order to pass from the inlet channel to the outlet channel. In order to ensure that no portion of liquid may pass directly through the mixing device, a central portion of the mixing element may be entirely free of holes. This central portion may for example consist of a portion having a radius of approximately ¼ to ⅓ the radius of the mixing element. The plurality of holes may be distributed in a radial direction and in a circumferential direction over the mixing element. By distributed in a radial direction it is meant that the holes may vary in the radial distance to the axis of the mixing device. By distributed in a circumferential direction it is meant that the holes may be distributed in a ring around the axis. The holes may be arranged in several rows, wherein each row contributes a fraction of the total number of holes and each row constitutes a ring of holes arranged concentrically with the axis of the mixing device. The number of rows may for example be at least four, such as from five to 10 rows. The number of holes in each row may vary depending on distance from the axis, such that the inner rows have fewer holes and the outer rows have more holes, in order to provide a relatively even spatial distribution of the holes. For example, the outermost row may have at least twice the number of holes as compared to the innermost row, such as from three to 10 times the number of holes, preferably four times the number of holes. The innermost row may be arranged at a first radial distance from the axis that is significantly less than a second radial distance from the axis to the outermost row. For example, the first radial distance may be approximately ½ to ½ of the second radial distance. The size of the holes may differ between rows, but preferably, all holes are the same size.

Each side of the mixing element may be supported by pillars extending across the inlet and/or outlet portion of the mixing cavity. The pillars may be distributed such that the entire surface of the mixing element is sufficiently supported. This may be achieved for example by distributing the pillars in both a radial direction outwards from the axis, and in a circumferential direction around the axis. Each pillar in the inlet portion may have a corresponding pillar in the outlet portion arranged collinearly, such that the mixing element is supported in the same region from both sides. The number of pillars should be sufficient to prevent buckling or deformation of the mixing element during use. For example, at least 10 pillars on each side of the mixing element, such as from 10 to 20 pillars, may be desirable.

The mixing device may be designed such that the mixing element lies in a mirror symmetry plane. This means that the internal volumes on each side of the symmetry plane: the inlet channel and inlet portion of the mixing cavity on the inlet side, and the outlet channel and outlet portion of the mixing cavity on the outlet side, may be symmetric with each other. This allows the mixing device to provide the same mixing properties regardless of its orientation in the liquid flow path, and this simplifies installation of the mixing device for the user. Note that the portions of the mixing device not in the liquid flow path do not necessarily have to be symmetric and it may in fact in some cases be advantageous to manufacture the mixing device from non-symmetric inlet and outlet components, e.g. in order to facilitate fastening of one component to the other.

The mixing device may be designed such that the axis along with the inlet and outlet channels extend is a central axis. In such a case, the mixing cavity and mixing element will also be centred on the central axis. The inlet channel, outlet channel, mixing cavity and mixing element may all preferably be essentially circular in cross section (in a plane perpendicular to the central axis). The plurality of holes in the mixing element may be arranged such that the mixing device has symmetry around the central axis or central point of the mixing element, at least for the internal volume defined by the mixing device. This symmetry may be of any suitable type, including but not limited to order 2, 3, 4, 5, or 6 rotational symmetry around the central axis, or a centre of inversion about the central point of the mixing element.

The mixing device may be manufactured to any suitable scale. For a laboratory scale device, the mixing cavity may suitably have a diameter of from about 10 mm to about 100 mm, preferably about 25 mm. The mixing cavity may have a height of from about 1 mm to about 10 mm. The mixing cavity may have a diameter of from 100 to 500 times the diameter of each hole in the mixing element, such as about 200 times the diameter of each hole. Each hole in the mixing element may suitably have a diameter of from about 0.1 mm to about 1 mm, such as about 0.12 mm. The inlet channel may have a diameter of from about 2 to 10 times the diameter of each hole, such as about four times the diameter of each hole, measured at its narrowest point. The outlet channel may have a diameter of from about 2 to 10 times the diameter of each hole, such as about four times the diameter of each hole, measured at its narrowest point. The inlet and outlet channels may preferably have the same diameter. The laminar mixing element is preferably as thin as possible while still providing the mechanical stability required. For example, the mixing element may have a thickness less than the diameter of the inlet channel, and may for example have a thickness in the range of from about 0.1 to about 1 mm, such as from about 0.3 to about 0.4 mm. The pillars may suitable have a diameter greater than the inlet and outlet channels, such as a diameter approximately two or more times the diameter of the inlet channel.

The mixing device is preferably manufactured in materials that are well-compatible and approved for use with the liquids being processed. Due to the high pressures prevailing in the mixing device, the material should also possess excellent mechanical properties. Such materials include but are not limited to stainless, titanium, and/or PAEK (Polyaryletherketone) polymers such as PEEK (Polyether ether ketone), PEK, PEKK, PEEKK and PEKEKK. Titanium or PEEK are preferred.

The mixing device may be manufactured by any means known in the art. For example, the mixing device may be manufactured as several component parts suitable for assembly to the final mixing device. These components include, but are not limited to:

an inlet component constituting the inlet channel, inlet portion and optionally the inlet pillars of the mixing device;

an outlet component constituting the outlet channel, outlet portion and optionally the outlet pillars of the mixing device; and a laminar component constituting the laminar mixing element.

The laminar component may for example be formed from a single thickness of sheet material, such as sheet metal, perforated with the mixing holes. The sheet thickness may be in the range of from about 0.1 to about 1 mm, such as from about 0.3 to about 0.4 mm.

Each component may be machined using any appropriate method. For example, the laminar component may favourably be laser-cut from sheet titanium or PEEK, as this provides an accurate pattern of holes at a relatively low cost.

The mixing device may comprise further components, such as a fastening component arranged to fasten the inlet component, the outlet component and the laminar component in relation to each other. The fastening may preferably be reversible in order to facilitate disassembly of the mixing device if required. To this end, an outer surface of the inlet component, outlet component or both may be furnished with screw threads in order to facilitate reversible assembly. The mixing device may further comprise sealing rings arranged to provide a seal between the laminar component and the inlet and outlet components respectively. This assists in preventing leakage at the outer wall of the mixing cavity. The sealing rings may for example be O-rings fashioned from a suitable compatible material.

Alternatively, the mixing device may be manufactured as a single component using additive manufacturing techniques. The exact additive manufacturing technique will depend on the material used for the mixing device, but suitable methods may include selective laser melting, selective laser sintering, electron beam melting or fused filament fabrication. Methods of additive manufacturing suitable materials such as stainless, titanium and PEEK are known in the art.

In use, the mixing device is coupled into a flow path of a liquid requiring mixing. For example, the mixing device may be coupled downstream of a switching valve that provides a desired buffer composition by periodic switching between two liquid sources. Such a switching valve provides a means of controlling the exact composition of a buffer over time, but since the liquid is provided downstream of the valve as "packets" of a first liquid and a second liquid with limited diffusive mixing between them, mixing is required to reduce fluctuation in the liquid composition. As liquid is pumped thought he mixing device it flows axially through the inlet channel until it reaches the mixing cavity. Here, the liquid is pressed outwards from the inlet channel into the inlet portion of the mixing cavity, and may only pass through to the outlet portion of the mixing cavity by passing through one of the holes provided in the mixing element. Since the holes are distributed over the mixing element and the liquid flow is sub-divided between the holes, each sub-flow passing through each hole takes an individual flow path with an individual path length. These sub-flows are then reintegrated in the outlet portion of the mixing cavity and passed onwards to the outlet channel. The difference in path length provides mixing between the alternating "packets" of the first liquid and the second liquid, i.e. the composition of the liquid passing through the mixer is effectively time-averaged over a period of time greater than the switching frequency of the switching valve.

The invention will now be described in more detail with reference to certain exemplifying embodiments and the drawings. However, the invention is not limited to the exemplifying embodiments discussed herein and/or shown in the drawings, but may be varied within the scope of the appended claims. Furthermore, the drawings shall not be considered drawn to scale as some features may be exaggerated in order to more clearly illustrate certain features.

FIG. 1 schematically illustrates a laboratory system 1 comprising a mixing device 9. The laboratory system is configured for preparative chromatography and comprises a first buffer container 3, a second buffer container 5 and a buffer switch valve 7 arranged to switch between the first buffer and second buffer in order to provide a desired buffer composition during the chromatography run. This may include providing a buffer gradient, whereby the composition of the buffer is gradually changed during the run by altering the ratio of first buffer to second buffer. The mixing device 9 is arranged downstream of the switch valve 7. A pump 11 produces a flow of liquid through the system and may for example be a peristaltic pump. The pump 11 is illustrated herein as being located downstream of the mixing device 9, but may alternatively be located upstream. After the pump 11, a sample injection valve 13 is provided for transferring the sample into the chromatography system. Downstream of the injection valve 13 a chromatography column 15 is arranged. Liquid exiting the column 15 passes through a detector 17, such as a UV-detector, before passing to an outlet valve 19 for disposal or collection.

Figure 2:
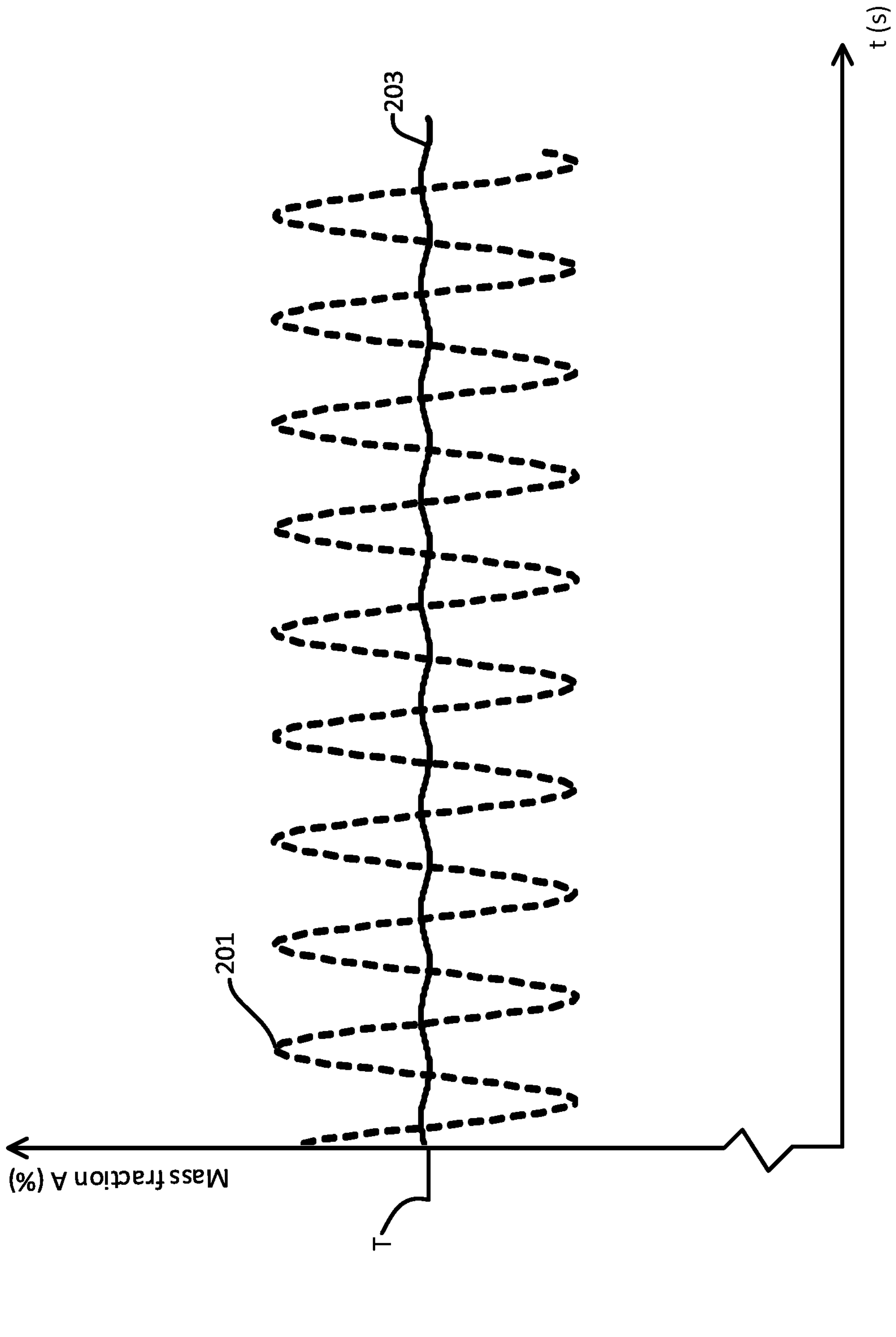
FIG. 2 schematically illustrates the effect of passing a buffer through a mixing device on the buffer composition over time.

FIG. 2 schematically illustrates the effect of passing a buffer through a mixing device. The x-axis represents time in seconds, and the y-axis represents the mass fraction of a component A of the buffer. Value T is a target value for the mass fraction of component A. Line 201 represents the component A mass fraction as a function of time at the mixing device inlet. Line 203 represents the component A mass fraction as a function of time at the mixing device outlet. It can be seen that the mixing device significantly reduces fluctuation in the composition of the buffer, and that in general at any given time the composition of buffer exiting the mixing device is closer to the target value than buffer entering the mixing device. For example, reductions in fluctuation amplitude of over 90%, such as a reduction greater than 95%, may be achieved by mixing devices according to the present invention.

Figure 3A:
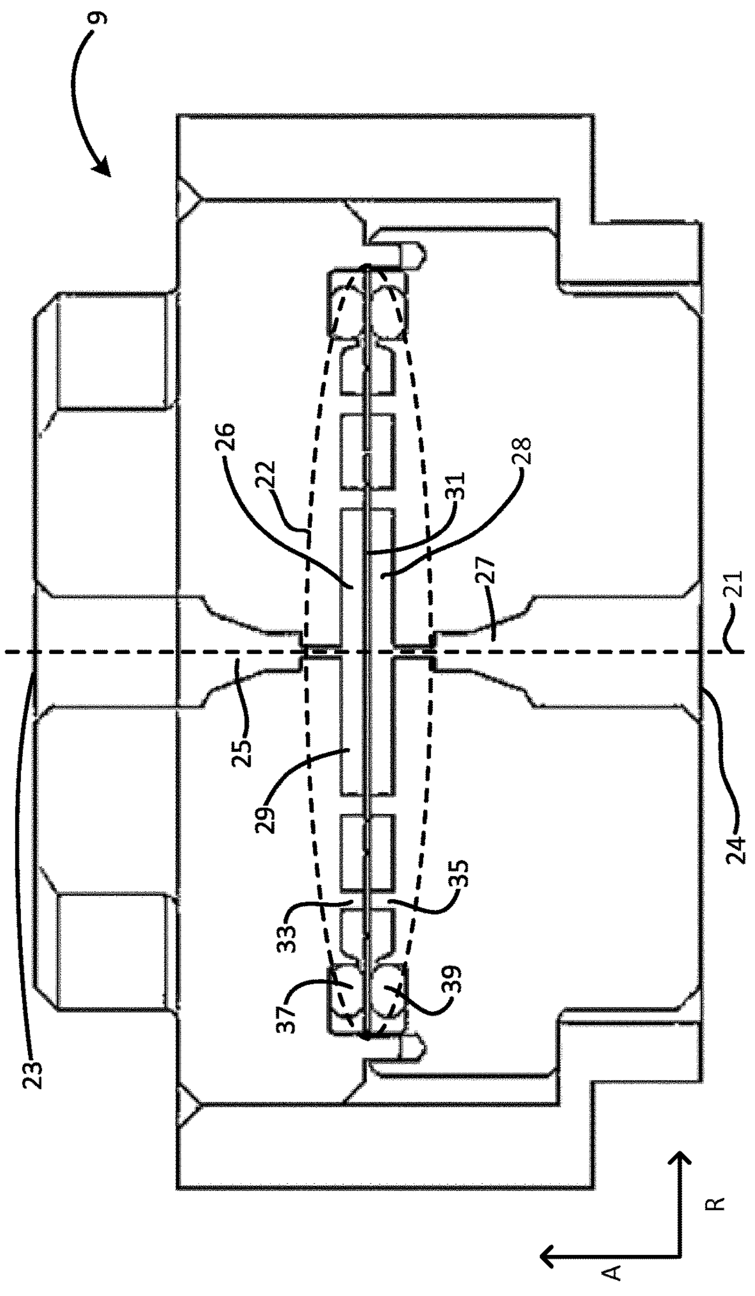
FIG. 3*a* schematically illustrates a cross-sectional view of a mixing device according to an embodiment of the present invention.
Figure 3B:
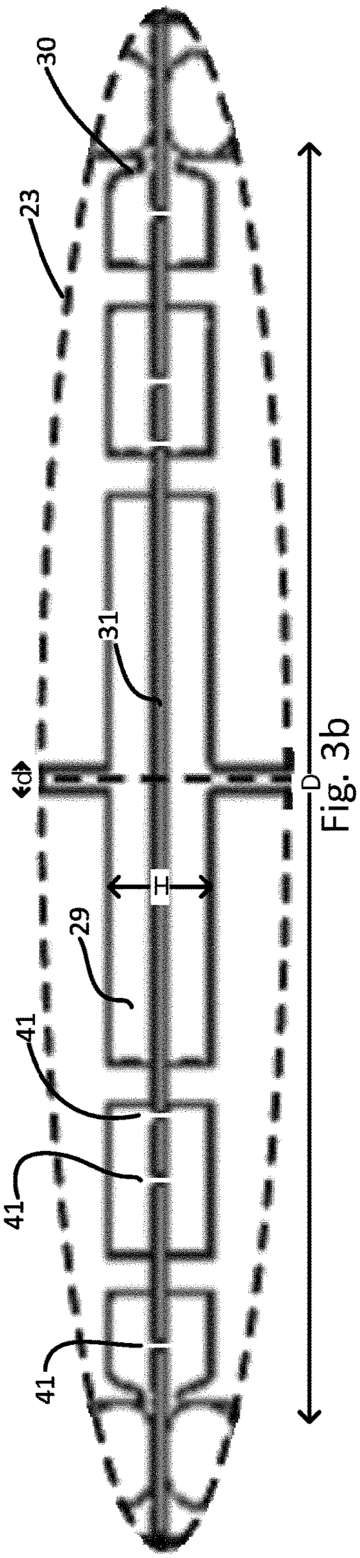
FIG. 3*b* schematically illustrates an enlarged view of the mixing device illustrated in FIG. 3*a;*

FIG. 3*a* schematically illustrates a mixing device 9 according to an embodiment of the present invention. The figure is a cross-sectional side view of the mixing device 9 along a plane in which axis 21 is contained. FIG. 3*b* schematically illustrates an expanded view of the mixing chamber as delineated by dotted line 22. It can be seen that the mixing device 9 comprises an inlet channel 25 extending along the axis 21 to an upper end 23 of the mixing device 9. An outlet channel 27 extends along the axis 21 to a lower end 24 of the mixing device 9. A mixing cavity 29 is arranged between inlet channel 25 and outlet channel 27. Mixing element 31 is arranged in the mixing cavity 29 and extends to the outer wall 30 of the mixing cavity 29, supported by inlet pillars 33 and outlet pillars 35. The mixing element 31 divides the mixing cavity 29 into an inlet portion 26 and an outlet portion 28. An inlet O-ring 37 and outlet O-ring 39 are arranged to prevent leakage from the mixing cavity. A plurality of holes 41 are arranged in the mixing element 31. It can be seen that the inlet channel 25 and outlet channel 27 each have a diameter d. Mixing cavity 29 extends in an axial direction A along the axis and in a radial direction R radially outwards from the axis. The mixing cavity 29 has a diameter D in the radial direction R and a height H in the axial direction A. Each of the plurality of holes 41 has a diameter 6 (not shown). It can be seen that the flow volume as demarcated by inlet channel 25, outlet channel 27 and mixing cavity 29 exhibits mirror symmetry about the plane in which mixing element 31 lies.

Figure 4C:
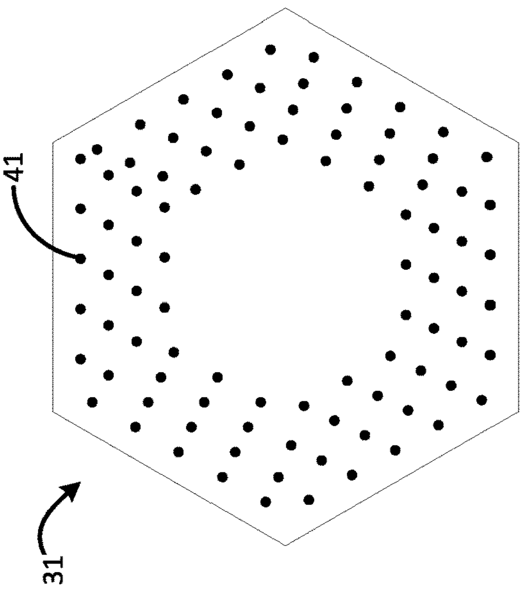
FIG. 4*c* schematically illustrates a further embodiment of a mixing element according to the present invention.
Figure 4B:
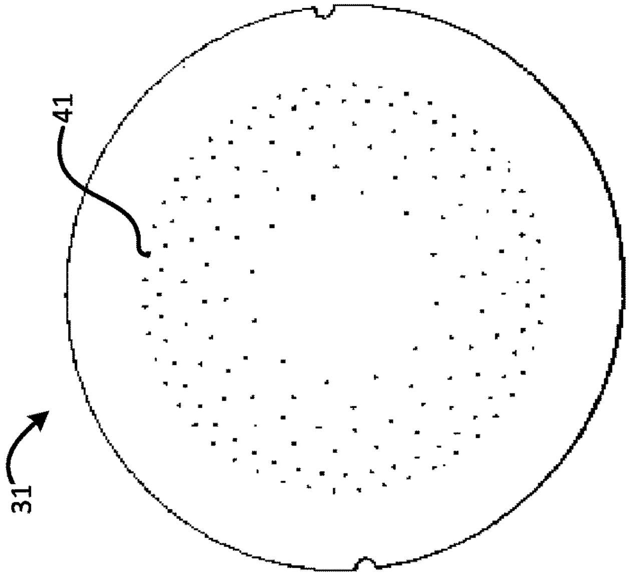
FIG. 4*b* schematically illustrates another embodiment of a mixing element according to the present invention.
Figure 4A:
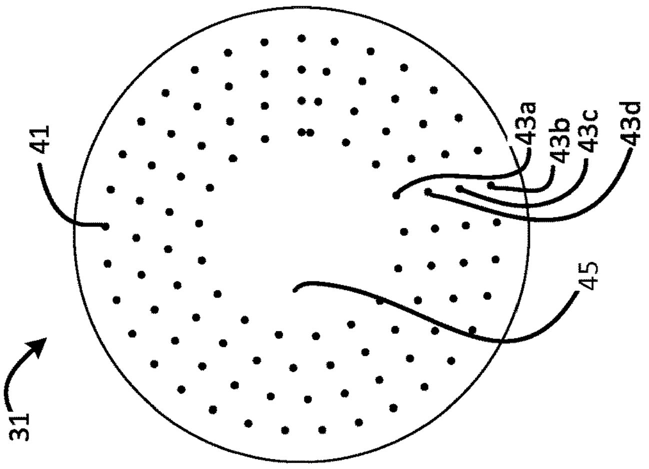
FIG. 4*a* schematically illustrates an embodiment of a mixing element according to the present invention.

FIG. 4*a* schematically illustrates a mixing element 31 according to an embodiment of the invention. It can be seen that the plurality of holes 41 are arranged in four circular rows 43*a*, 43*b*, 43*c*, 43*d*, arranged concentrically with the axis (not shown) and that an inner portion 45 of the mixing element 31 arranged concentrically with the axis is free from holes. The number of holes in innermost row 43*a* is fewer than the number of holes in the outermost row 43*d*. The holes 41 each have a diameter δ (not shown).

FIG. 4*b* schematically illustrates a mixing element 31 according to another embodiment of the invention. It can be seen that the plurality of holes 41 are arranged in six concentric circular rows. The holes 41 each have a diameter 6 (not shown) differing from the holes 41 illustrated in FIG. 4*a*.

FIG. 4*c* schematically illustrates a mixing element 31 according to a further embodiment of the invention. It can be seen that the plurality of holes 41 are arranged in six concentric hexagonal rows. The holes 41 each have a diameter 6 (not shown) differing from the holes 41 illustrated in FIGS. 4*a* and 4*b*.

Figure 5:
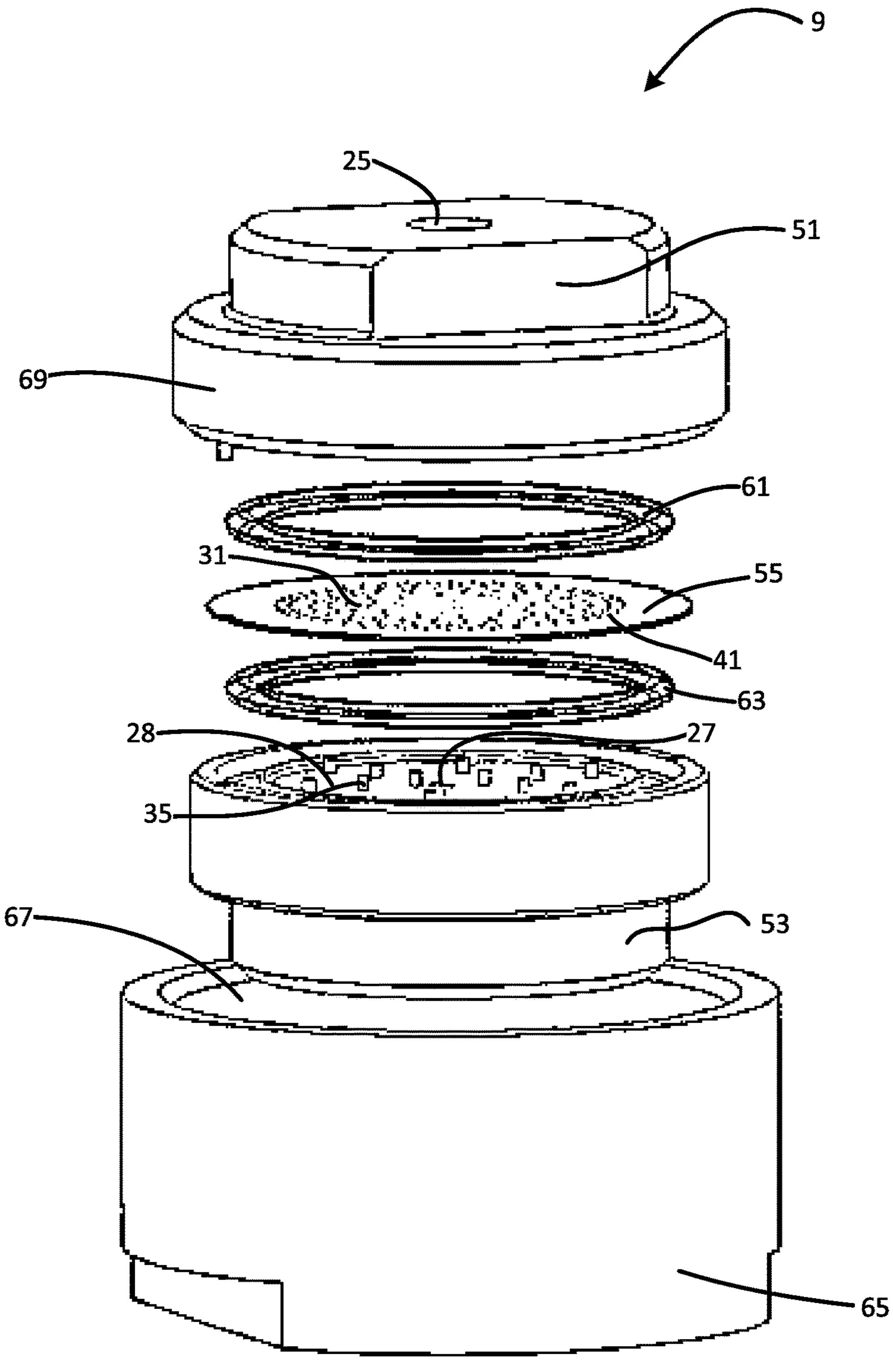
FIG. 5 schematically illustrates an exploded view of a mixing device according to the present invention.

FIG. 5 schematically illustrates an exploded view of a mixing device 9 according to the invention. It can be seen that the mixing device 9 comprises an inlet component 51, an outlet component 53 and a laminar component 55. The inlet component 51 constitutes the inlet channel 25, inlet portion (not shown) and inlet pillars (not shown) of the mixing device 9. The outlet component 53 constitutes the outlet channel 27, outlet portion 28 and outlet pillars 35 of the mixing device. The laminar component 55 constitutes the laminar mixing element 31 comprising a plurality of holes 41. A seal is provided between the inlet component 51 and laminar component 55 by inlet O-ring 61. A seal is provided between the outlet component 53 and laminar component 55 by outlet O-ring 63. A fastening component 65 is provided in order to fix the various components in relation to each other. The outlet component 53 rests within a cavity 67 provided in the fastening component 65. The laminar component 55 is positioned on the outlet component 53 with O-rings 61,63 placed to prevent leakage. Finally, the inlet component 51 is positioned and forms a fastening contact with the fastening component 65. For example, an outer surface 69 of the inlet component 51 may be provided with screw threads that form a fastening contact with screw threads arranged on a corresponding surface of cavity 67. However, other fastening means known in the art, such as a snap fastener or retaining ring may be utilized. It can be seen that the mixing device 9 comprises few components and be readily be disassembled and reassembled if desired.

The invention claimed is:

1. A static mixing device for laboratory systems comprising an inlet channel, an outlet channel, a mixing cavity, a laminar mixing element arranged within the mixing cavity, 10 to 20 inlet pillars, and 10 to 20 outlet pillars, wherein the inlet channel extends along an axis of the mixing device from a first end of the mixing device to the mixing cavity;

the outlet channel extends along the axis from the mixing cavity to a second end of the mixing device arranged opposite to the first end;

the mixing cavity is arranged between the inlet channel and the outlet channel, wherein the mixing cavity extends in an axial direction along the axis and in a radial direction along the axis and in a radial direction outwardly from the axis to an outer wall of the mixing cavity;

the laminar mixing element extends radially across the mixing cavity into an inlet portion and an outlet portion, wherein the mixing element comprises a plurality of holes extending through the mixing element, wherein said holes are distributed over the mixing element, the mixing element further comprising at least four rows of holes where each row of holes constitutes a ring of holes arranged concentrically with the axis of the mixing device, wherein an innermost row of the plurality of holes is distributed at a first radial distance from the axis and an outermost row of the plurality of holes is distributed at a second radial distance from the axis, wherein the second radial distance is greater than the first radial distance, and wherein the outermost row comprises at least twice the number of holes as compared to the innermost row.

2. The mixing device according to claim 1, wherein the outlet pillars are distributed in the outlet portion of the mixing cavity and extend axially across the outlet portion such that each outlet pillar supports an outlet side of the mixing element.

3. The mixing device according to claim 1, wherein the inlet pillars are distributed in the inlet portion of the mixing cavity and extend axially across the inlet portion such that each inlet pillar supports an inlet side of the mixing element.

4. The mixing device according to claim 1, wherein each inlet pillar is arranged collinearly with a corresponding outlet pillar, such that each respective pair of inlet/outlet pillars supports the mixing element at the same region from both sides.

5. The mixing device according to claim 1, wherein the inlet and/or outlet pillars are distributed both in a radial direction and in a circumferential direction over the mixing element.

6. The mixing device according to claim 1, wherein the said plurality of holes are distributed both in a radial direction and in a circumferential direction over the mixing element.

7. The mixing device according to claim 1, wherein the plurality of holes comprises at least 50 holes, or from 100 to 300 holes, or about 170 holes.

8. The mixing device according to claim 1, wherein an inner portion of the mixing element is free from holes.

9. The mixing device according to claim 1, wherein each hole has a diameter of from about 0.1 mm to about 1 mm, or about 0.12 mm.

10. The mixing device according to claim 1, wherein the inlet channel and/or outlet channel have a diameter of from two to 10 times the diameter of each hole.

11. The mixing device according to claim 1, wherein the mixing cavity has a radial diameter of from 100 to 500 times the diameter of each hole, or about 200 times the diameter of each hole.

12. The mixing device according to claim 1, wherein the axis is a central axis of the mixing device.

13. The mixing device according to claim 1, wherein the outer wall is arranged concentrically with the axis.

14. The mixing device according to claim 1, wherein the mixing element is arranged in a mirror symmetry plane, and wherein the inlet channel, outlet channel and mixing cavity exhibit mirror symmetry about the mirror symmetry plane.

15. The mixing device according to claim 1, wherein the mixing device is additively manufactured as a single component.

16. The mixing device according to claim 1, wherein the mixing device is manufactured in titanium, PAEK, stainless or combinations thereof.

17. The mixing device according to claim 1, wherein the laminar mixing element is manufactured in titanium, PAEK, stainless or combinations thereof.

18. The mixing device according to claim 1, comprising at least three components: an inlet component, an outlet component and a laminar component;

wherein the inlet component constitutes the inlet channel, inlet portion and the 10 to 20 inlet pillars of the mixing device;

the outlet component constitutes the outlet channel, outlet portion and the 10 to 20 outlet pillars of the mixing device; and the laminar component constitutes the laminar mixing element.

19. The mixing device according to claim 18, wherein the laminar component is manufactured by laser cutting.

20. The mixing device according to claim 18, further comprising a fastening component arranged to reversibly fasten the inlet component, the outlet component and the laminar component in relation to each other.

21. The mixing device according to claim 18, further comprising an inlet sealing ring arranged to provide a seal between the inlet component and the laminar component, and/or an outlet sealing ring arranged to provide a seal between the outlet component and the laminar component.

* * * * *